(12) United States Patent
Teo et al.

(10) Patent No.: US 8,165,098 B2
(45) Date of Patent: *Apr. 24, 2012

(54) METHOD FOR ALLOCATING RESOURCES IN CELL-EDGE BANDS OF OFDMA NETWORKS

(75) Inventors: Koon Hoo Teo, Lexington, MA (US); Zhifeng Tao, Allston, MA (US); Xuehong Mao, Salt Lake City, UT (US); Amine Maaref, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 750 days.

This patent is subject to a terminal disclaimer.

(21) Appl. No.: 12/335,379

(22) Filed: Dec. 15, 2008

(65) Prior Publication Data

US 2009/0201867 A1 Aug. 13, 2009

Related U.S. Application Data

(60) Provisional application No. 61/027,566, filed on Feb. 11, 2008, provisional application No. 61/039,505, filed on Mar. 26, 2008.

(51) Int. Cl.
*H04B 7/216* (2006.01)

(52) U.S. Cl. ............ 370/335; 455/450; 370/342

(58) Field of Classification Search .......... 370/335, 370/342; 455/410, 450–454
See application file for complete search history.

(56) References Cited

U.S. PATENT DOCUMENTS

| | | | | |
|---|---|---|---|---|
| 2006/0205412 | A1* | 9/2006 | Oh et al. | 455/450 |
| 2008/0146231 | A1* | 6/2008 | Huang et al. | 455/436 |
| 2010/0029212 | A1* | 2/2010 | Malladi et al. | 455/63.1 |
| 2010/0197314 | A1* | 8/2010 | Maaref et al. | 455/450 |

* cited by examiner

*Primary Examiner* — Phuc Tran
(74) *Attorney, Agent, or Firm* — Dirk Brinkman; Gene Vinokur (57) ABSTRACT

A method allocates bandwidth from a radio frequency spectrum in a cellular network including a set of cells. Each cell includes a base station for serving a set of mobile stations in the cell. An area around each base station is partitioned into a center region and an edge region. In each base station, cell-center bandwidth for use by the mobile stations in the center region is reserved according to an inter-cell interference coordination (ICIC) protocol, and cell-edge bandwidth for use by the mobile stations in the edge region is reserved according to the ICIC protocol. The bandwidth can be fixed or adaptive to reduce the signaling overhead. The adaptive bandwidth can be further partitioned into reserved and the free bands. Mobile stations are classified as primary and secondary users, depending on whether they use or are assigned the fixed or adaptive band radio resources.

24 Claims, 10 Drawing Sheets

METHOD FOR ALLOCATING RESOURCES IN CELL-EDGE BANDS OF OFDMA NETWORKS

RELATED APPLICATIONS

This U.S. Non-Provisional Patent Application claims priority to U.S. Provisional Patent Application 61/027,566, "Combined Fixed and Adaptive Resource Allocation Method for Inter-Cell Interference Coordination and Reduction in OFDMA Systems," filed by Teo et al. on Feb. 11, 2008, and U.S. Provisional Patent Application 61/039,505, "Method for Resource Allocation in Cell-Edge Bands of OFDMA Systems," filed by Teo et al. on Mar. 26, 2008, both incorporated herein by reference.

FIELD OF THE INVENTION

This invention is related to inter-cell interference coordination (ICIC), and more particularly to ICIC in Orthogonal Frequency Division Multiplexing Access (OFDMA) networks.

BACKGROUND OF THE INVENTION

Orthogonal Frequency Division Multiplexing Access (OFDMA)

Orthogonal Frequency Division Multiplexing Access (OFDMA) is used in 3rd Generation Partnership Project (3GPP) Long Term Evolution (LTE) and the Worldwide Interoperability for Microwave Access (WiMAX) networks. The available spectrum is partitioned into orthogonal subcarriers. The orthogonality among the subcarriers can reduce intra-cell interference (ICI). In LTE networks, base stations are connected via a mesh of so-called X2-interfaces.

Inter-Cell Interference (ICI)

In the context of OFDMA, inter-cell interference (ICI) occurs when adjacent cells assign the same frequency to different user equipment (UE) or MSs. The most severe ICI originates from the frequency collision on the edges of the cells. If the frequency in which the BS1 communicates with MS1 on the edge in one cell is the same as the frequency in which the BS2 communicates with MS2 on the edge of an adjacent cell, then the interference has the greatest impact in both downlink and uplink directions.

Physical Resource Block (PRB) or Radio Resource Block (RRB)

The controllable radio resource in OFDMA network has three aspects: frequency, time and space. The resource element considered in the invention is the physical resource block (PRB), which spans both the frequency and time domain. The PRB is also known as the Radio Resource Block (RRB). The component frequencies of one PRB can be either contiguous or disjoint. The time duration of the PRB is defined by Transmission Time Interval (TTI). By reusing the PRB among cells or sectors of cells, frequency division, time division and spatial division are achievable.

Inter-Cell Interference Coordination (ICIC)

Inter-Cell Interference Coordination (ICIC) can effectively reduce ICI in cell-edge regions. ICIC aims to allocate disjoint channel resources to a cell-edge MS and a potentially interfering MS(s) in an adjacent cell. By careful coordination between the cell-edge MS and its interfering MS(s), the ICI can be greatly reduced.

Cell-Edge and Cell-Center

To avoid frequency collision, various frequency reuse schemes are known in the prior art. The most straightforward method assigns non-overlapping bandwidth (BW) to adjacent cells. This enables the elimination of frequency collision at the cost of spectrum efficiency. To overcome this drawback, soft and fractional frequency reuse, (FFR) have been described. Both schemes partition the BW into two parts: cell-edge BW and cell-center BW.

Within each cell, User Equipment (UE) or mobile stations can be partitioned into two groups. Cell-edge UEs are assigned to cell-edge BW, while cell-center UEs can use the cell-edge bandwidth, when available. Usually the cell-edge BW takes a ⅓ fixed portion of the entire BW. The transmit power on each BW can be changed adaptively according to the interference level.

Primary and Secondary UEs

The UEs can be partitioned into two groups based on a priority of the UEs. UEs with highest priority to the radio resource are primary UEs, such as police, ambulance, etc. Secondary UEs have to terminate their transmission when the occupying resources are required by a primary UE.

Base Station Cooperation (BSC)

Base station cooperation (BSC) enables multiple BSs to transmit signals to a single MS concurrently while sharing the same resource, i.e., time and frequency, using beam forming.

SUMMARY OF THE INVENTION

The embodiments of the invention provide a combined fixed and adaptive resource allocation for inter-cell interference coordination (ICIC) techniques in OFDMA network for both downlink and uplink scenarios by taking both long and short term traffic variation into account and pursuing smart coordination in frequency, time and spatial domains, as well as power control at both the UEs and the base stations.

Specifically, a method allocates bandwidth from a radio frequency spectrum in a cellular network including a set of cells, wherein each cell includes a base station for serving a set of mobile stations in the cell. An area around each base station is partitioned into a center region and an edge region.

Each base station reserves cell center bandwidth for allocation to the mobile stations in the center-region according to an inter-cell interference coordination (ICIC) protocol, and cell-edge bandwidth for allocation to the mobile stations in the edge region according to the ICIC protocol and a base station cooperation (BSC) protocol.

Allocating the cell-center and the cell-edge bandwidth to the mobile stations, as the mobile stations communicate with the base stations according the ICIC protocol and the BSC protocol.

DETAILED DESCRIPTION OF THE EMBODIMENTS OF THE INVENTION

Network

Figure 1:
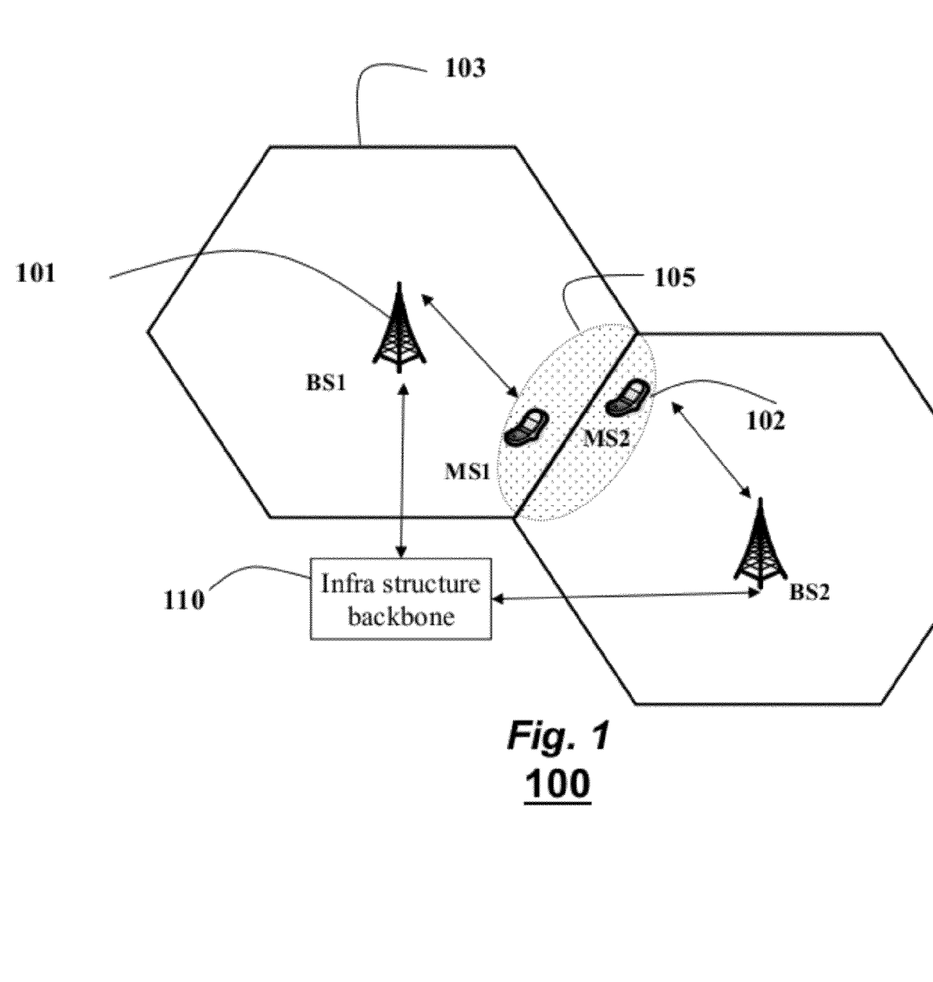
FIG. 1 is a schematic of network requiring Inter-cell Interference Coordination in OFDMA network according to embodiments of the invention.

As shown in FIG. 1, a wireless cellular network 100 includes base stations (BSs or eNode-B) 101, and mobile stations (MSs) 102 arranged in cells 103. The BSs are connected via an infrastructure backbone 110, or X2 interface. The infrastructure enables the BSs to interchange information, as described herein. It is desired to provide inter-cell interference coordination (ICIC) for the network, particularly to the mobile stations in an edge regions 105. Cells can be partitioned into sectors as described below.

Bandwidth Mappings

Figure 2:
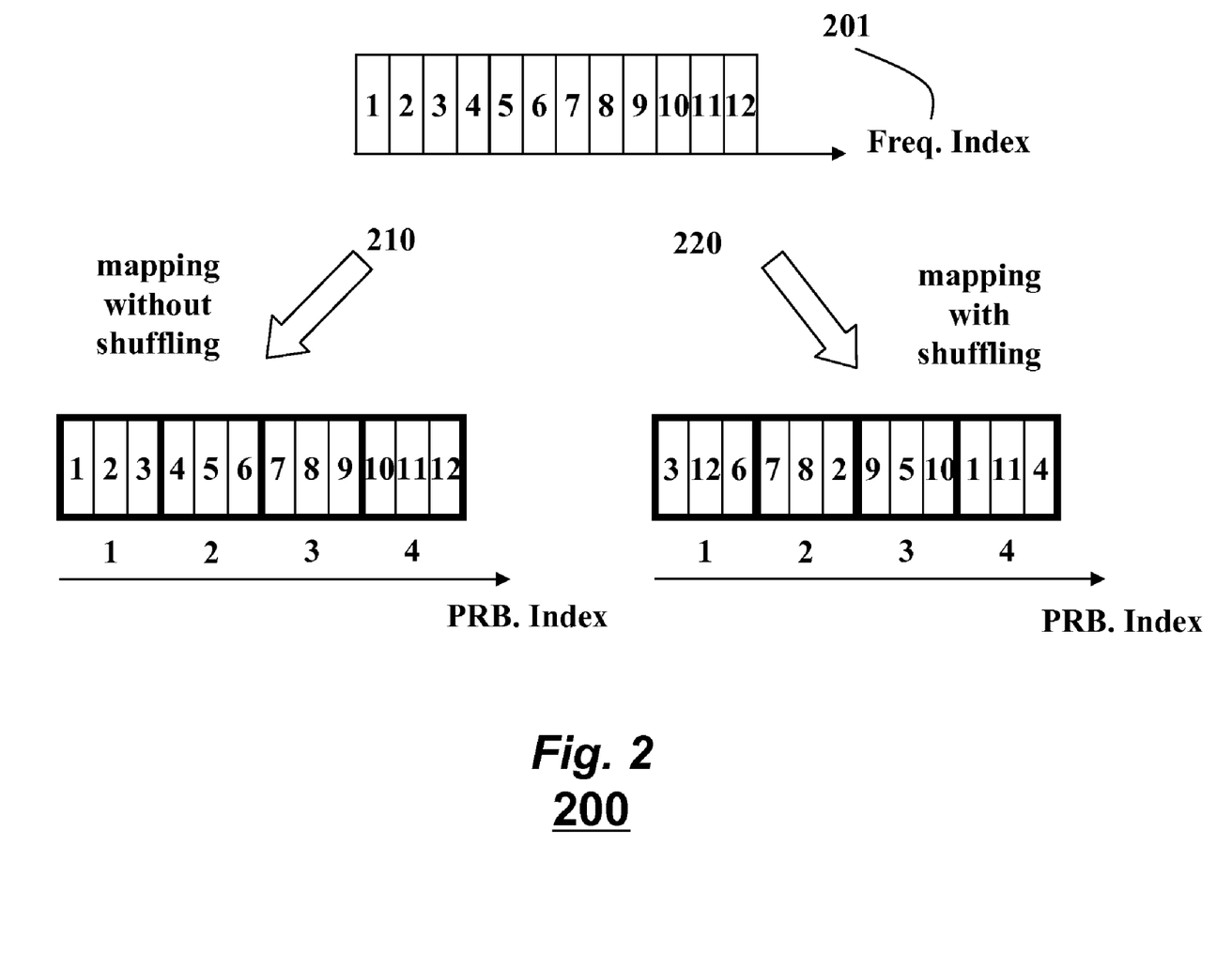
FIG. 2 is a block diagram of mapping from frequency to Physical Resource Blocks.

FIG. 2 shows two different mapping schemes 200 from physical frequency channel to physical resource block (PRB) for given frequency indices 201: mapping with shuffling 210 and mapping without shuffling 220. The later scheme takes the advantage of the frequency selectivity. The frequency index and the PRB index are used to notate the resource element in terms of frequency and PRB respectively.

Fixed and Adaptive Cell-Edge Band

Figure 3:
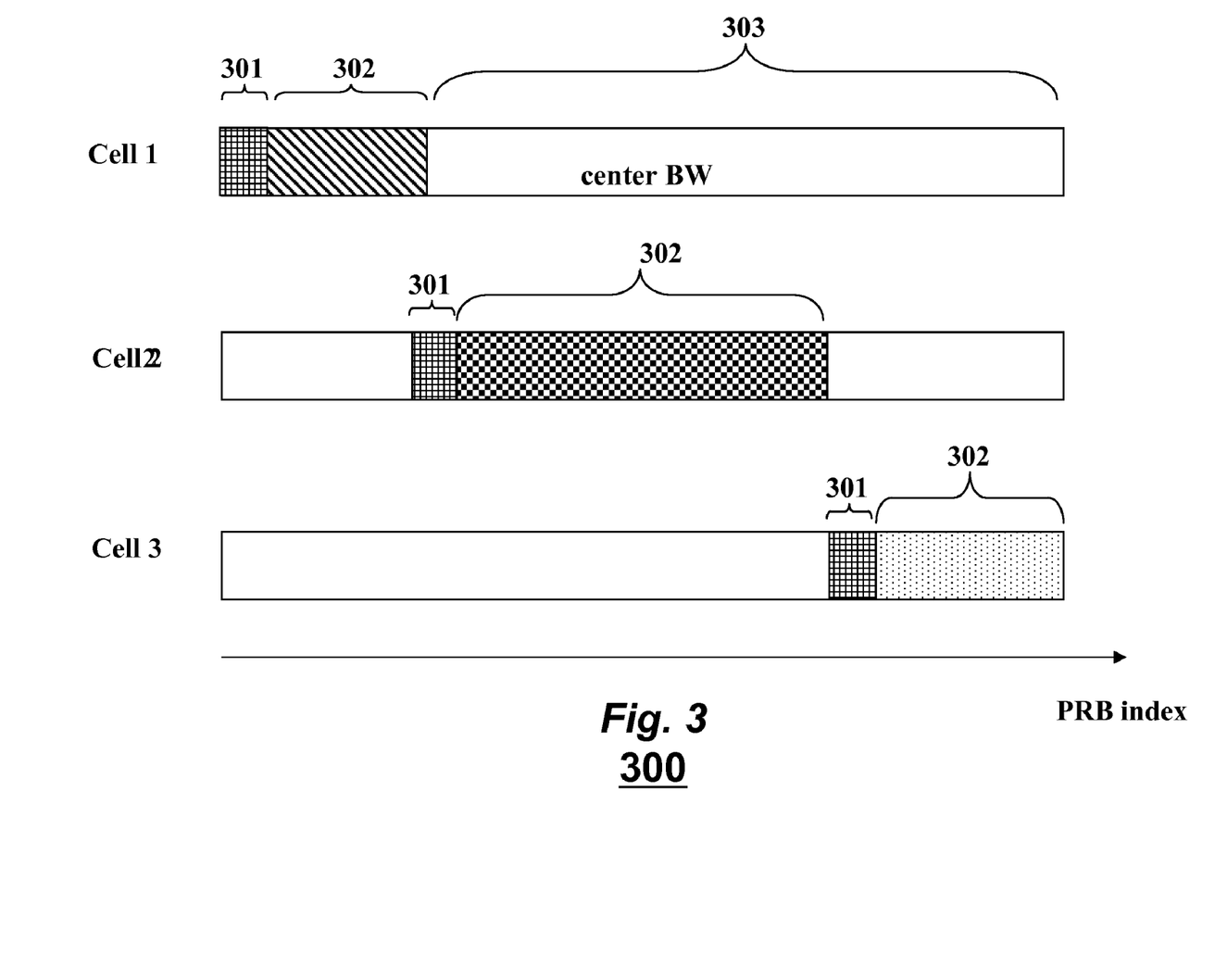
FIG. 3 is a block diagram of fixed cell-edge bandwidth, adaptive cell-edge bandwidth, and cell-center bandwidth according to embodiments of the invention.

FIG. 3 shows band allocation for three example cells as a function of PRB index. The embodiments of the invention focus on the cell-edge band which includes two parts: fixed cell-edge band (FCEB) 301 and adaptive cell-edge band (ACEB) 302 as a function of the PRB index, and as indicated by the various shadings. The cell center bandwidth 303 is left blank. It is clear form FIG. 3, that the ACEB are disjoint.

The FCEB guarantees the requirements of the primary user equipment (UEs) at cell edge. However, this invention does not preclude the use of fixed resource allocation for primary UEs at cell centers.

The width and allocation of the FCEB is configurable according to the variation of the traffic load, which may change in a timescale ranging from hours to days. The ACEB is allocated dynamically to satisfy the semi-static traffic load in a shorter timescale ranging from few hundreds of milliseconds to hundreds of seconds.

In general, each sector of a cell is allocated a fixed cell-edge band (FCEB), and an adaptive cell-edge band (ACEB) radio resource. The UEs using the FCEB are known as the primary UEs, and the rest of the EUs use the AECB.

Adaptive Radio Resource

The adaptive radio resource is classified into two categories, one is reserved and the other is free. There are three options possible for the adaptive radio resource:
1) all of the adaptive radio resource is totally used as reserve;
2) a combination of reserved and free; and
3) totally used as free.

The network can select any one of these options.

The reserved radio resources give the UEs in a sector the priority to use the resource. If UEs in another sector of the same or other cells needs to use the reserve not belonging to it, then the sector needs to "borrow" the resource from a donor. When the connection ends, the borrower cell or sector transmits a "release" signal to the donor. When the release signal is received, the donor can resume using the reserved resource.

For the fixed radio resource, the owner has overriding rights over its resource when the owner needs the resource. In other words, the owner of the fixed resource is the primary user. If the owner needs the resource, all other users using the same resource, if allowed, have to release this resource immediately. In the case of the free adaptive resource, any sector can use it, but only when the sector has exhausted its reserved if they are available.

Resource Allocating and Configuration of FCEB

Assuming the minimum traffic load within each cell is known, two methods are described to configure the FCEB.

The first method specifies the start and end frequencies $\{f_{F_s}^{i,k}, f_{F_e}^{i,k}\}$. In this case, the FCEB in each cell is $$BW_F^i = \sum_k f_e^{i,k} - f_s^{i,k},$$

where i is the index of cells and k is the index of component subbands of the FCEB within each cell.

The second method specifies a central frequency $f_F^{i,k}$ and bandwidths $B_F^{i,k}$. In this case the FCEB in each cell is $$BW_F^i = \sum_k B_F^{i,k}.$$

The first method is recommended when each cell is able to determine the level of interference of adjacent cells, and at which PRBs. The PRBs with the least interference are suggested to be assigned to the FCEB in order to guarantee a high Signal to Interference-plus-Noise Ratio (SINR) on the cell edge.

Furthermore, the frequency and time components of the subbands of the FCEB are not necessarily contiguous. The benefit of the FCEB is to reduce the signaling overhead because each cell has highest priority to a certain amount of radio resource without having to share the resource with others.

When there are no primary UEs in the cell-edge, the unassigned FCEB can be reused by UEs in the cell-center. Before taking the unoccupied FCEB, the cell-center UEs have to sense the FCEB spectrum to make sure there are no primary UEs are currently communicating. After a primary UE on the FCEB is detected through, for example, a high interference indicator (HII), or other indicators, the cell-center UE terminates the transmission immediately to avoid causing interference.

Resource Allocation and Configuration of the ACEB

Network Layout

Figure 4A:
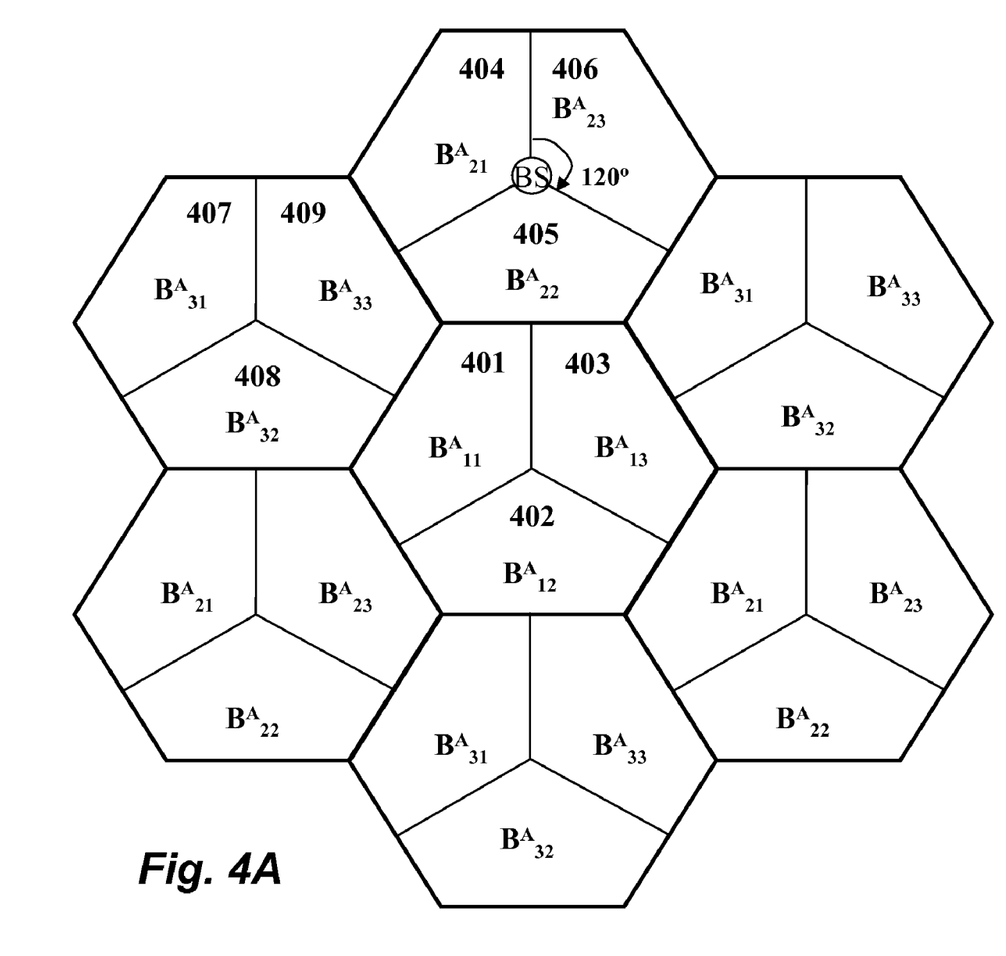
FIGS. 4A-4B are schematics of two different layouts of the multi-cell multi-sector network according to embodiments of the invention.
Figure 4B:
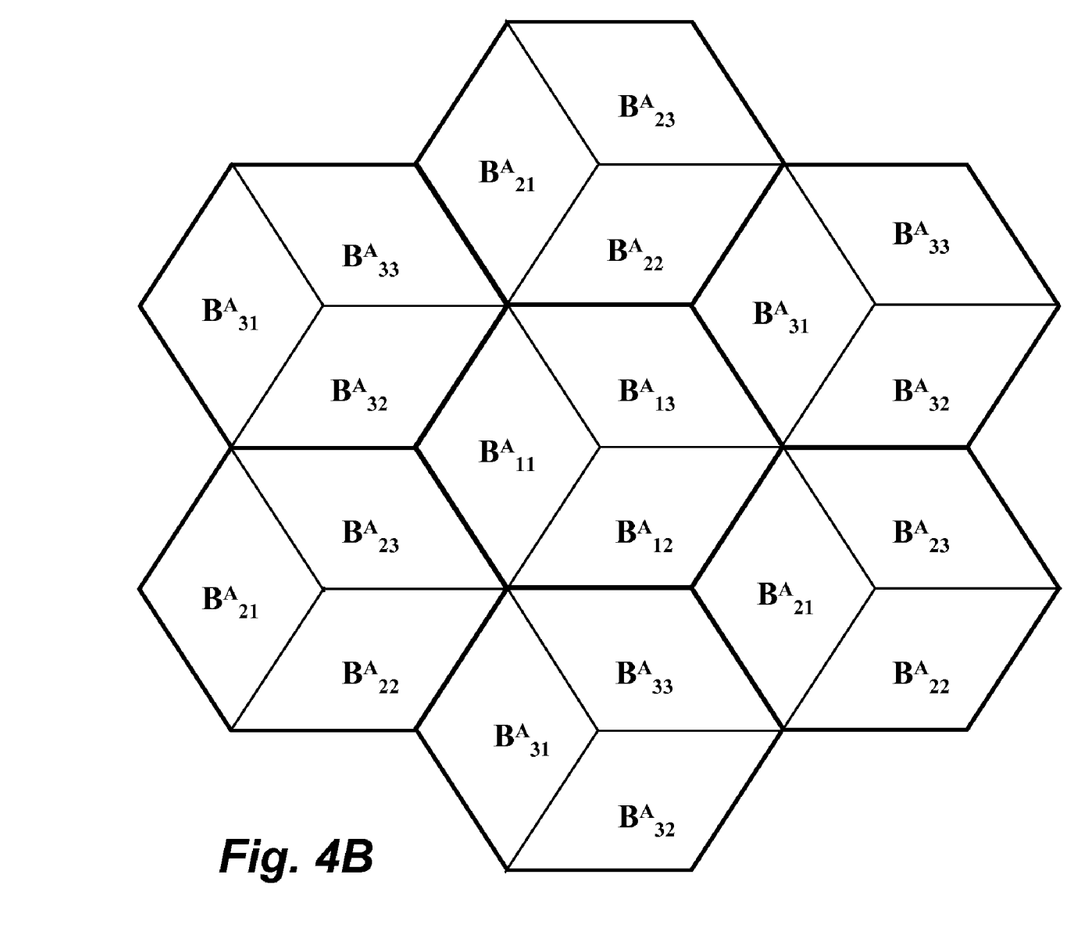

FIG. 4A-4B show example multi-cell and multi-sector networks. Each cell is partitioned into three sectors. The antennas are configured to have 120° directionality towards the edges of the hexagons in FIG. 4A, and the "corners" of the cells in FIG. 4B. It is understood that the "footprint" of the cells can vary, and the hexagons for the cells and the circles for the cell-centers are only a convenient representation.

The superscript "A" means adaptive, and the subscripts provide an example of a frequency allocation scheme according to an embodiment of the invention wherein by the adaptive cell-edge bandwidth B is partitioned into three parts (1, 2, 3). The first subscript denotes one of these bandwidth parts. The second subscript is the sector number within each cell.

The adaptive cell-edge bandwidth (ACEB) allocation as described herein is based on the layout shown in FIG. 4A. It can also be modified to the network with the layout shown in FIG. 4B.

The bandwidth is assumed to be in the granularity of PRBs, which contains a certain amount of arbitrary subcarriers. Therefore, the band for each cell and sector can be regarded as a subset of either disjoint or contiguous PRBs.

Reserved ACEB

Similar to the soft-frequency-reuse (SFR) scheme of the prior art, the invention assigns three non-overlapping subbands to the cell-edge UEs in each cell to ensure that the cell-edge UEs that are in adjacent cells do not cause interference to each other.

The differences of this invention from the conventional SFR scheme are:
1) cell-edge band is partitioned into three partitions for the three sectors within each cell; and
2) the cell-edge band is not allocated unless needed. The reserved ACEB makes radio resource management possible.

As shown in FIGS. 4A, 4B, non-overlapping subbands are assigned to sectors 401~409 so that the frequency collision on cell edge among any adjacent cells and sectors is avoided.

Adaptive Resource Allocation within Intra-Cell Sector

To minimize the "rippling" effect on other cells, the invention first adapts the assignment of the ACEB within the intra-cell. For example, when sector 1 in cell 1 knows there is severe interference on the currently occupied ACEB, the base station for that sector first requests PRBs from the reserved ACEB. The maximum amount of achievable resource, in this step of the adaptation, is determined by the reserved bandwidth or radio resource of cell 1.

Meanwhile, the base station in cell 1 also informs the adjacent cells which PRB it is using. In the case that the interference is reduced after taking this step, no further steps are required. However, if the reserved ACEB radio resource is insufficient for the current traffic in this sector, the second step which involves the adjustment among the intra-cell sectors will be taken.

In the case that the interference is reduced after the first two steps, and confined within a cell, then there is no impact on the radio resource allocation of other cells. Therefore the rippling effect is avoided.

Adaptive Resource Allocation within Inter-Cell Sectors

After the adjustment within the intra-cell sectors, and if the network performance is still experiencing interference in the cell-edge UEs, adjustment has to be made among inter-cell sectors. First, the cell or sector uses the free ACEB radio resource, if it is available. If the free ACEB is used up, then the cell looks for the reserved ACEB radio resource belonging to another cell. In both cases, there are two types of resource sharing in this step: resource borrowing and frequency reuse.

For example, with reference to FIG. 4A, the cell-edge traffic load in sector 401 is greater than sector 402 and sector 403. Therefore, sector 401 reuses the PRBs from the farthest sectors in adjacent cells (404 and 407) or "borrow" the frequencies from adjacent sectors (405, 406, 408 and 409). In the case of inter-cell sectors resource allocation, any uncalculated action may cause rippling effect, which increases the ICI. Therefore, intelligent allocation is required.

Figure 7:
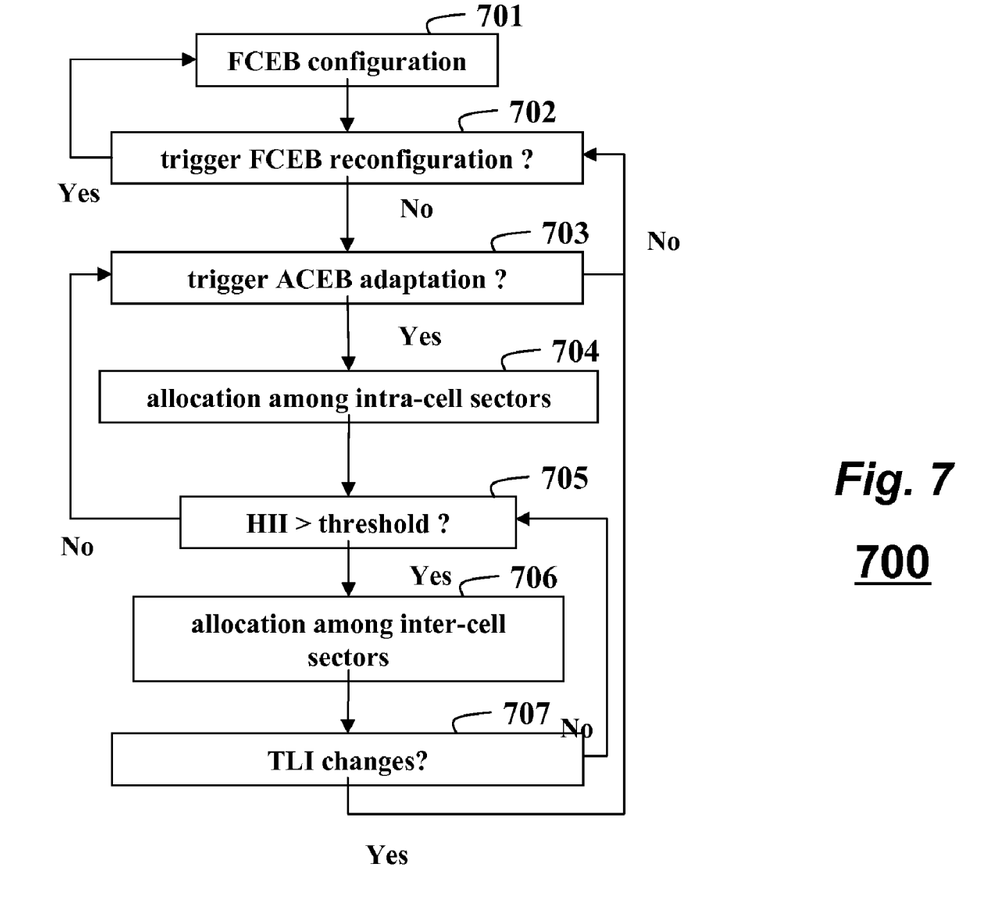
FIG. 7 is a flow diagram of a method for allocating radio resources according to embodiments of the invention.

FIG. 7 shows the method 700 for combined fixed and adaptive radio resource allocation according to embodiments of the invention. The method begins in the FCEB configuration 701. Step 702 determines whether a FCEB reconfiguration is required. Step 703 determines whether ACEB adaptation is required. Step 704 performs intra-cell allocation. Step 705 checks the HII threshold, see below. Step 706 performs inter-cell allocation. Step 707 checks the TLI, see below.

Several basic principles for the method are described below. If the free ACEB radio resource is exhausted or not an option, then borrow PRB from adjacent sectors of their reserved ACEB and reuse PRB from the furthest sectors of the adjacent cells, if this does not cause mutual interference.

The interfered cell 'shrink' its cell-center bandwidth by excluding the borrowed PRBs from its available PRB list to avoid the intra-cell interference.

The cells that "lend" the PRBs to the over-loaded cell keep the borrowed PRB out of its available list in order to avoid the ICI until a 'release signal' is received.

The number of PRBs that can be borrowed is determined by the traffic load indicator (TLI). The function of TLI is to indicate the level of traffic load in each sector/cell.

The amount of residual PRB in each cell is indicated by the high interference indicator (HII). The function of HII is to indicate the level of interference on each PRB within each cell. The details of TLI and HII are described below.

Power Allocation

Figure 5:
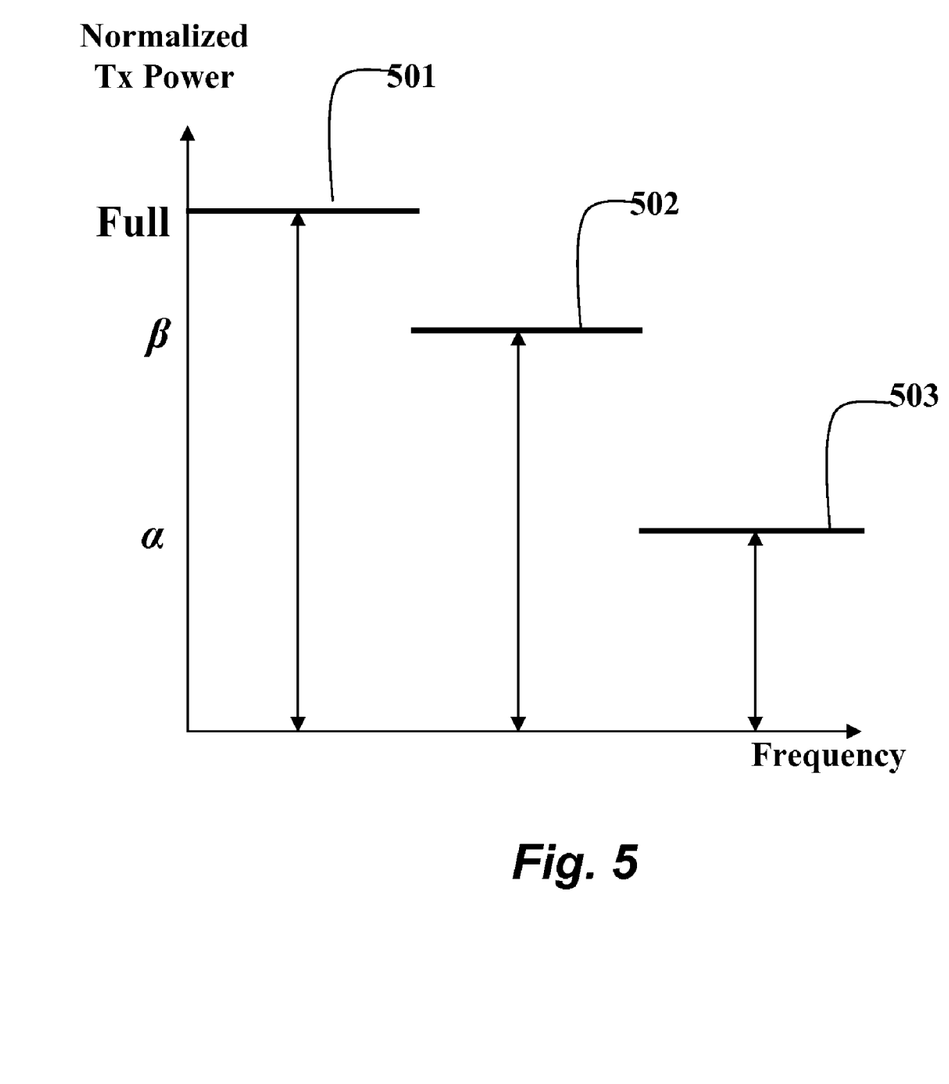
FIG. 5 is a schematic of an adaptive power allocation scheme as a function of frequency according to embodiments of the invention.

As shown in FIG. 5, three types of band are defined in this invention: Cell-center Band (CCB) 501, Fixed Cell-edge Band (FCEB) 502, and Adaptive Cell-edge Band (ACEB) 503. Different power levels are preferred according to the different types of bands.

The full power level $P_{full}$ is preferred for the FCEB to guarantee the QoS of the primary UEs on cell edge or even for the cell center UEs to achieving high capacity or availability. To minimize the interference of cell-center UEs, the transmitting power on CCE 503 is $\alpha \cdot P_{full}$. The transmitting power level on the ACEB 502 is set in between, which is $\beta \cdot P_{full}$. The factors $\alpha$ and $\beta$ satisfy the inequality $0<\alpha<\beta<1$. The power level for each type of band is defined as the maximum transmitting power on the frequency. The transmitting power has to be adaptive in order to deal with the fading and shadowing of the wireless channel. This power allocation is for the downlink scenario. With a slight modification, it is also feasible for the uplink.

TLI and HII

TLI indicates which sector/cell is requesting resources from adjacent cells. The TLI is exchanged over the infrastructure backbone 110, see FIG. 1. The TLI indicates the traffic load level (low, medium, high) in each sector/cells. If necessary, a sector can be further partitioned into a number of sub-sectors with the TLI indicating their traffic load levels and locations. The TLI takes the advantage of location indicator at the cost of signaling overload.

The HII is also exchanged over the backbone 110. The HII is designed to:
(1) Distinguish the UE type (cell-center UE, cell-edge primary UE, cell-edge UE) on the particular PRBs; and
(2) Indicate the transmit power level of each PRB, or set of PRBs. The number of power levels is suggested to range from two (low, high) to four (low, medium, high and highest) and is represented by one or two bits respectively.

Figure 6A:
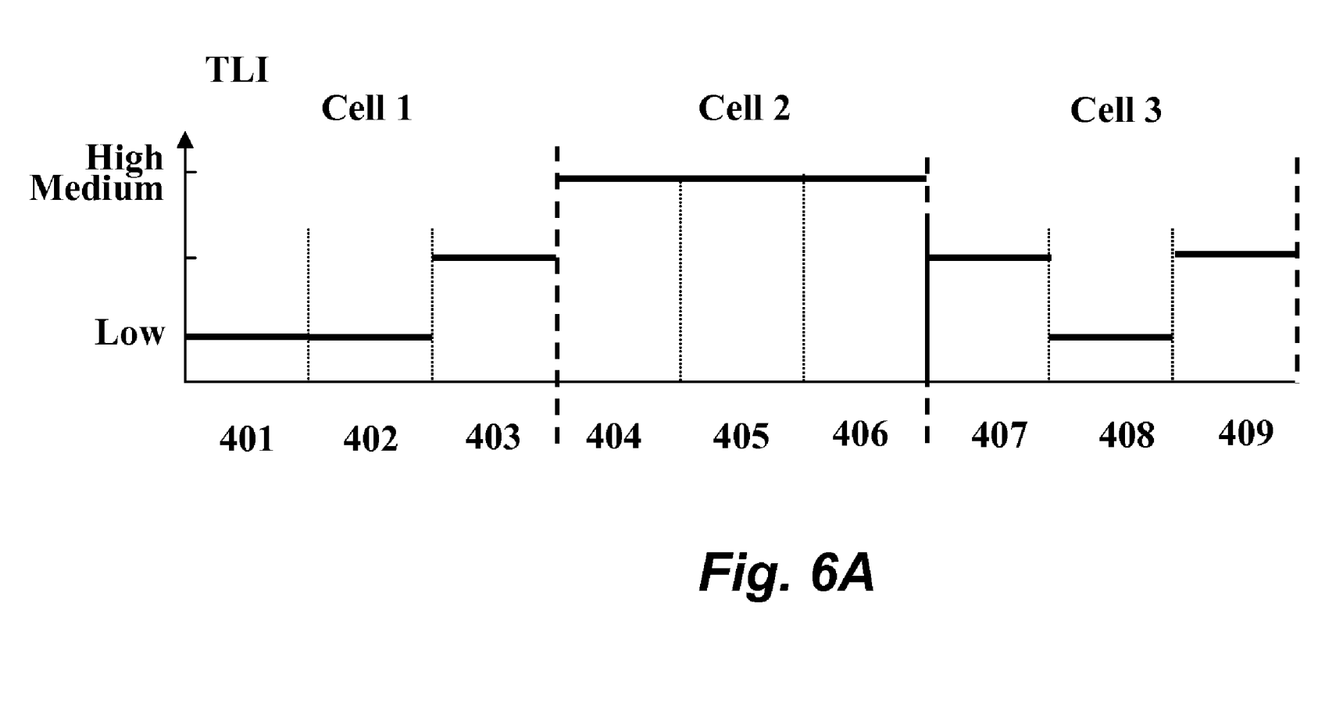
FIGS. 6A-6C are schematics of adaptive resource allocation among inter-cell sectors according to embodiments of the invention.

FIG. 6A shows example TLIs as a function of PRB indices for three adjacent cells. FIG. 6A shows that the traffic in sectors 403-406 in cell 2 is over-loaded. These sectors need extra PRBs from sectors in adjacent cells. The TLIs also indicate the traffic load in sector 401, 402 in cell 1 and sector 408 in cell 3 is low.

Figure 6B:
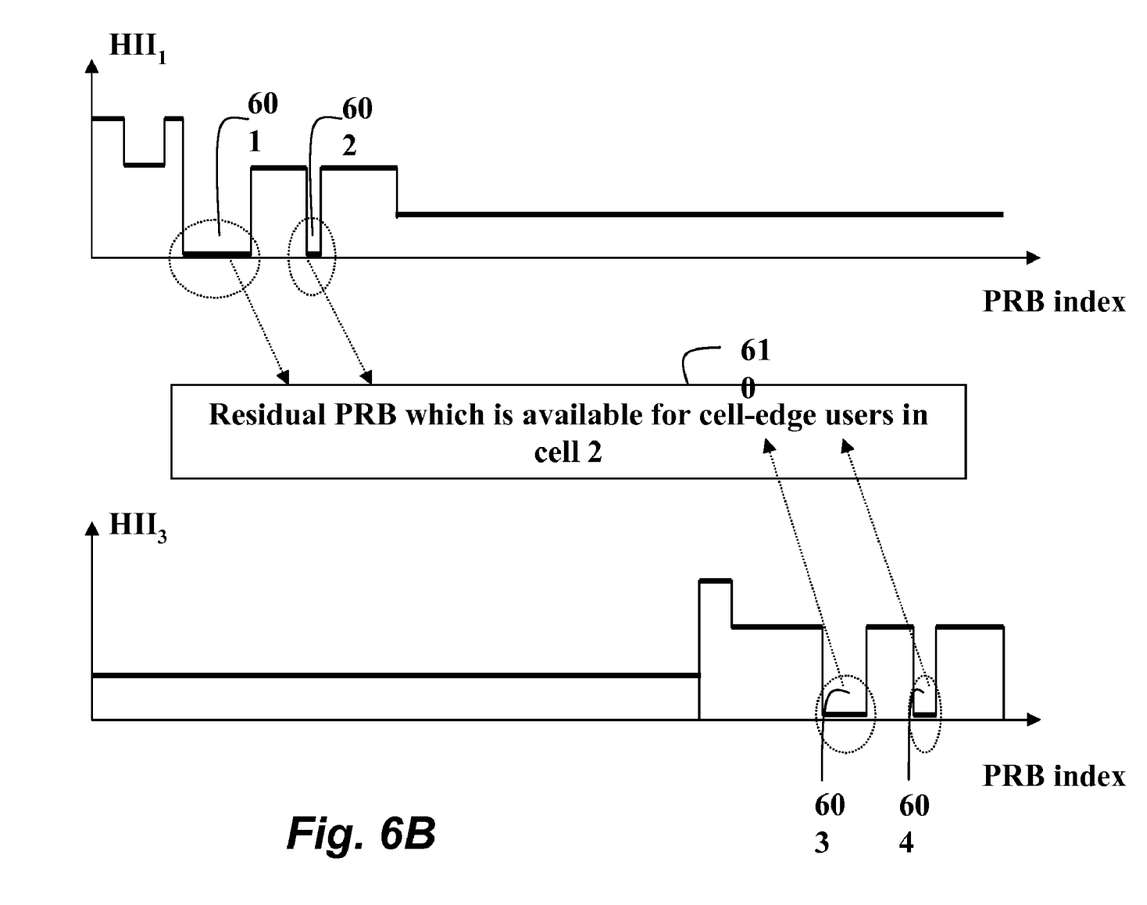

FIG. 6B shows HII as a function of PRB indices. $HII_1$ and $HII_3$ are the HII for cell 1 and cell 3, respectively. Two bits specify the four different types of UE: cell-center UE using CCB (CC-CCB), primary cell-edge UE using the FCEB (CE- FCEB), secondary cell-edge UE using the ACEB (CE-ACEB) and no UE the ACEB (Null-ACEB).

Cooperating with the TLI, the over-loaded cell (cell 2) can recognize the PRBs indicating by dash-line circles 601-604 in FIG. 6A are the residual available resources 610 for borrowing.

Figure 6C:
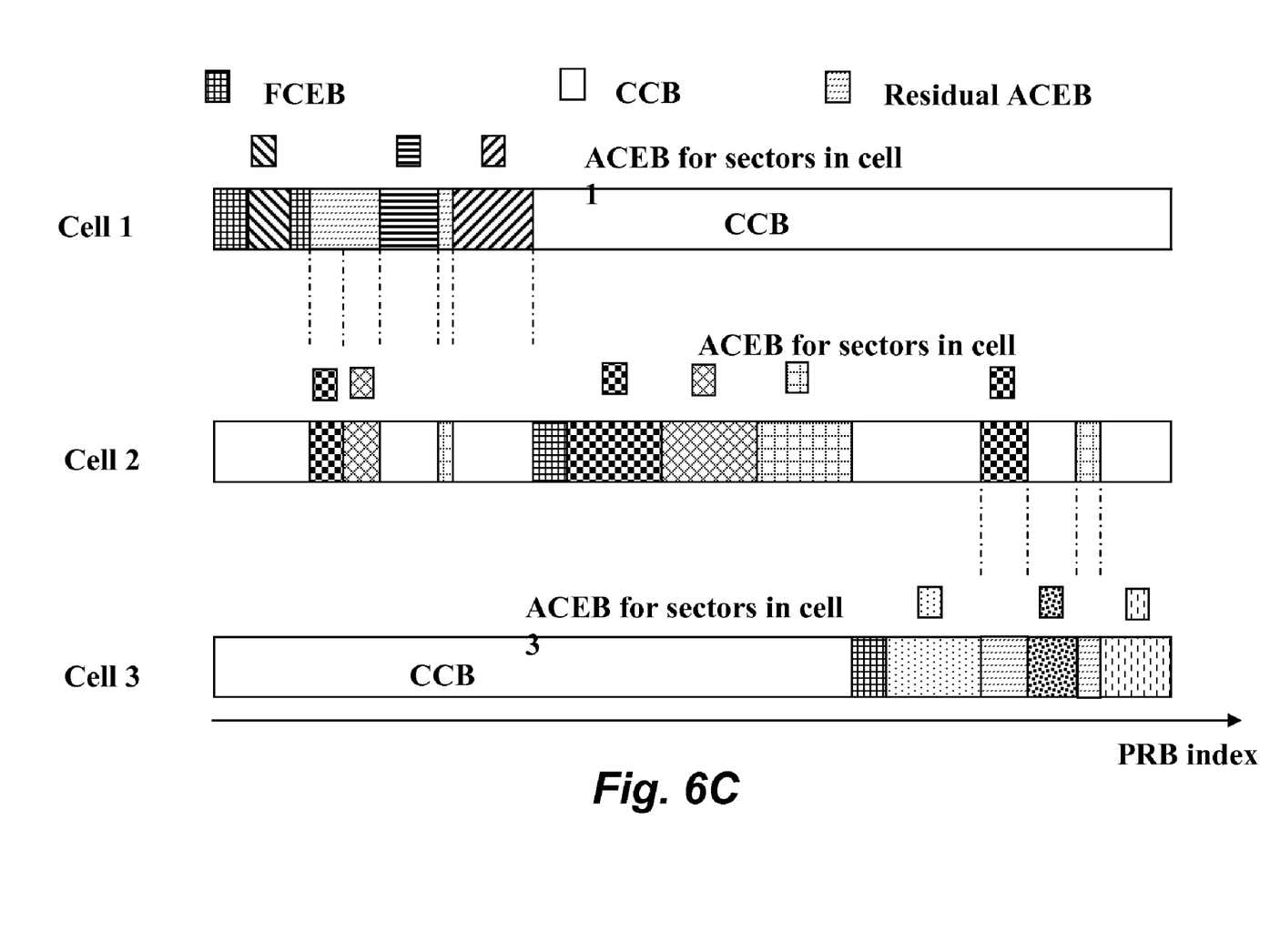

FIG. 6C shows example allocation of PRB after adaptive allocation among inter-cell sectors. For clarity, reference numerals are omitted. The FCEB, CCB, and residual ACEB are indicated by shading.

In order to reduce the signaling overhead, the PRBs can be partitioned into groups, and the HII is updated periodically, e.g., every 20 ms or longer. The period is less than the duration of the semi-static frequency allocation.

Allocation of the Bands

The FCEB and the reserved part of the ACEB are usually disjoint bands, whereas the free part of the ACEB can be disjoint or overlapping bands assigned to the cells or sectors.

The fraction of network bandwidth allocated to the FCEB is predetermined for the network, e.g., by the service provider. The benefit of the FCEB is to reduce the network signaling overhead because each cell is given the exclusive right to use this bandwidth, and the bands are disjoint among adjacent cells. The cell has the right to use its FCEB resources without having to measure interference or wait for an interference indicator. This reduces delay and incurs a low signaling overhead. In other words, when a cell or a sector that 'owns' the FCEB band wants to use this resource, the cell can go ahead and use it without being concerned about adjacent cells or sectors using the band and causing collision or interference.

Thus, a primary UE has the advantage that the BS can assign radio resources to the primary UE with minimum delay, and without having to worry about unplanned for interference. This is one way of defining the FCEB. Another way of defining the FCEB is that part or all the FCEB can be temporary borrowed by another cell or sector in that cell. However, when a cell or a sector that owns FCEB resources wants to reassert its ownership on the resources that are currently borrowed by another cell or sector, then one of the following resource release procedures takes place.

The adaptive reserved band gives the owner the priority to use the band, but not the overriding rights as in the case of the fixed bands. In other words, if the owner of the reserved radio resource intends to utilize the resource by signaling the intent, and the resource is borrowed, then the owner has to wait for the borrowing cell to release the radio resource within a predefined time, which can be owner specific. Owner here means a base station of a cell that "owns" the band or radio resource, and the resources are usually allocated in the non-overlapping bands.

The adaptive free bands can be used by any station as long as there no interference. Interference free is defined by an overload indicator (OI). The OI shows the level of interference for a particular frequency band. There can be multiple levels indicated. The OI indicator should not be greater than a predetermined threshold. These radio resources are allocated on a competitive basis, i.e., "first come, first served."

Recall of the PRB

There are two possible scenarios: the owner of the FCEB reasserts its right of the occupied PRB; and the owner of the reserved ACEB reasserts its right of the occupied reserved PRB.

In the first scenario, there are three options for which interference indicators can be used when the owner wishes to utilize its fixed radio resource:

Option 1: The owner orders the borrower to release the resources immediately by sending out a high interference indicator (HII) on the resources, i.e., the resources the owner wants to "take back." The borrower can continue to use the resources up to a (small) pre-defined time-out period, such as within the next time frame or time period in which HII can be received by the borrower. The owner relies on the OI to determine when the resources have been released by the borrower. If there is no borrower, then the owner can immediately proceed to use the resources.

The HII indicator is currently defined by the 3GPP LTE standard to indicate the PRBs in which the BSs schedules cell edge UEs causing high inter-cell interference. These PRBs are most sensitive to ICI. Therefore, the function of HII defined by 3GPP LTE is slightly different from what is indicated herein, but potentially could be reused.

Option 2: To prevent misinterpreting the HII, a new indicator, i.e., request for release indicator (RQRI) can be used. The owner orders the borrower to release the resources immediately by transmitting the RQRI for the resources, i.e., the resource the owner wants to "take back." The borrower can continue to use the resources up to a small pre-defined time-out period, such as within the next time frame or time period in which the borrower receives the RQRI. The owner relies on the OI to determine when the resources have been released by the borrower. If there is no borrower, then the owner can immediately proceed to use the resources.

Option 3: The owner of the fixed resource uses the fixed resource whenever is needed. The borrowers of this fixed band, which could be a cell or sector, have to monitor the OI regularly, such as every 20 ms, and to release the resource immediately or within the next time frame when the OI goes beyond the threshold.

Option 4: The owner of the fixed resource uses the fixed resource whenever it is needed and no adjacent cells are allowed to use the resource unless the network readjusts the fixed resource to the various cells or sectors Options 3 and 4 reduce the signaling overhead that needed to be exchanged over the X2 interface.

For the reserved the ACEB, there are two options of interference indicators that can be used when the owner wishes to reassert the use of its reserve radio resource:

Option 1: The owner orders the borrower to release the resources immediately by sending out an HII on the desired resources. The borrower can continue to use the resources up to a pre-defined time-out period, measured in ms. The time-out period is usually much longer than that for the FCEB. The owner relies on the OI to determine when the resources have been released by the borrower. If there is no borrower, then the owner can immediately proceed to use the resources. Again, this indication HII, high interference indicator, is currently defined by the 3GPP LTE standard to indicate the PRBs in which the BSs schedule cell edge UEs causing high inter-cell interference. These PRBs are most sensitive to ICI. Therefore, the function of HII by 3GPP LTE is slightly different from what is indicated herein, but potentially can be reused.

Option 2: Similar to the case for the FCEB, and to prevent the misinterpretation of the HII, the RQRI can be used. The owner orders the borrower to release the resources by sending out the RQRI for the resources the owner wants to "take back". The borrower can continue to use the resources up to a pre-defined time-out period, such as within the next few ms to hundreds or thousands of ms. This time-out period is usually much longer than that for the FCEB. The owner relies on the OI to determine when the resources have been released by the borrower. If there is no borrower, then the owner can immediately proceed to use the resources.

The owner can use the TLI from the borrower cells to determine whether the owner wants to reassert its priority to use a given reserved resource or to switch to another reserved resource block.

If the owner (a cell or a sector) of free the ACEB resources wants to reassert its ownership on the resources that are currently used by another cell or sector, then the owner has to wait until the sector or cell has released the resources. This can be done by monitoring the OI relative to the resources.

Resource Allocation and Configuration

Assuming the minimal traffic load within each cell is known, two methods are described for configuring the FCEB and the ACEB bandwidths.

The first method specifies the band by indicating the start and end frequencies $\{f_{Fs}^{i,k}, f_{Fe}^{i,k}\}$. In this case the, for example, the FCEB in each cell is $$BW_F^i = \sum_k f_e^{i,k} - f_s^{i,k},$$

where i is the index of cells, and k is the index of component subbands of the FCEB within each cell. The second method identifies the FCEB by specifying the central frequencies $f_F^{i,k}$ and bandwidths $B_F^{i,k}$. In this case the FCEB in each cell is $$BW_F^i = \sum_k B_F^{i,k}.$$

The band can also be specified by indicating the number of resource block and their respective logical locations within the logical bandwidth.

The FCEB reduces the signaling overhead because each cell is given the exclusive right to use this bandwidth, or the bands are disjoint among adjacent cells. The allocation of the fixed and the adaptive reserved bands among the cells is such that the bands do not interfere with each other. An example three cell network uses only a fixed-band scheme. The cell edge of each cell is allotted ⅓ of the total bandwidth if the traffic loadings among the three cells are equal.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for allocating bandwidth from a radio frequency spectrum in a cellular network including a set of cells, wherein each cell includes a base station for serving a set of mobile stations in the cell, comprising:
    partitioning an area around each base station into a center region and an edge region;
    reserving, in each base station, cell-center bandwidth for allocation to the mobile stations in the center region according to an inter-cell interference coordination (ICIC) protocol;
    reserving, in each base station, cell-edge bandwidth for allocation to the mobile stations in the edge region according to the ICIC protocol and a base station cooperation (BSC) protocol; and
    allocating the center-cell bandwidth and the cell-edge bandwidth to the mobile stations as the mobile stations communicate with the base stations according the ICIC protocol and the BSC protocol, and wherein the cell-edge bandwidth reserved for the center region and the cell-edge bandwidth reserved for edge region are disjoint.

2. The method of claim 1, wherein the partitioning uses an infrastructure of the network.

3. The method of claim 1, wherein the cell-center bandwidth for the ICIC protocol in the edge region and the cell-edge bandwidth for the BSC protocol in the edge region of the same cell are disjoint.

4. The method of claim 1, wherein the cell-center bandwidth reserved for center region of a particular cell and the cell-edge bandwidth reserved for the edge region of an adjacent cell are disjoint.

5. The method of claim 1, wherein the cell-center bandwidth reserved for the ICIC protocol in the center region of a particular cell and the cell-edge bandwidth reserved for the ICIC protocol in the edge region of an adjacent cell overlap.

6. The method of claim 1, wherein the cell-edge bandwidth reserved for the BSC protocol in the edge region is also used for the ICIC protocol.

7. The method of claim 1, further comprising:
    partitioning each edge region into a set of sectors, and further comprising:
    reserving and allocating disjoint cell-edge bandwidth for adjacent edge regions in different cells when the mobile stations use the ICIC protocol;
    reserving and allocating the same cell-edge bandwidth for adjacent edge regions in different cells when the mobile stations use the BSC protocol;
    partitioning the cell-edge bandwidth into fixed cell-edge bands and adaptive cell-edge bands; and
    partitioning the adaptive cell-edge bands into reserved bands and free bands.

8. The method of claim 7 wherein the bandwidth reserved for the fixed bands for each sector or cell are predetermined for the network.

9. The method of claim 8, wherein the sector or the cell with the fixed cell-edge bands has priority and right to use the cell-edge bands without communicating with other cells or sectors.

10. The method of claim 8, wherein each band is defined by a start frequency and an end frequency.

11. The method of claim 8, wherein each band is defined by a center frequency and a corresponding bandwidth.

12. The method of claim 8, wherein each band is defined by a number of a resource block and corresponding logical locations within a logical bandwidth.

13. The method of claim 7, wherein the cell-edge bandwidth reserved for the adaptive cell-edge bands for each sector or cell are predetermined for the network.

14. The method of claim 13, wherein the sector or the cell has priority to use the reserved bands.

15. The method of claim 13, wherein the sector or the cell determines whether the reserved bands are being used by other sectors or cells before using the reserved bands.

16. The method of claim 15, wherein the sector or the cell signals an intent to use the reserved bands before using the reserved bands.

17. The method of claim 13, wherein the sector or the cell can request the use of the reserved bands belonging to other sectors or other cells if the reserved bands are not in use.

18. The method of claim 17, wherein the sector or the cell determines whether reserved bands are being used by other sectors or cells before using the reserved bands.

19. The method of claim 17, wherein the sector or the cell indicates an intent to use the reserved bands before using the reserved bands.

20. The method of claim 13, wherein the sector or the cell requests the use of the free bands if the free bands are not in use.

21. The method of claim 20, wherein the sector or the cell determines whether the free bands are not in use.

22. The method of claim 20, wherein the sector or the indicates an intent to used the free bands.

23. The method of claim 7, wherein the mobile stations include primary user equipment, and the fixed cell-edge bands are guaranteed for the primary user equipment in the cell edge region.

24. The method of claim 1, wherein power levels for transmitting on the bands are adaptive.

* * * * *